(12) United States Patent
Cho

(10) Patent No.: US 7,900,043 B2
(45) Date of Patent: Mar. 1, 2011

(54) HARD DISK SECURITY METHOD IN A COMPUTER SYSTEM

(75) Inventor: Shu-Ching Cho, Taipei Hsien (TW)

(73) Assignee: Wistron Corp., Hsichih, Taipei Hsien (TW)

( * ) Notice: Subject to any disclaimer, the term of this patent is extended or adjusted under 35 U.S.C. 154(b) by 528 days.

(21) Appl. No.: 12/055,598

(22) Filed: Mar. 26, 2008

(65) Prior Publication Data

US 2009/0037720 A1    Feb. 5, 2009

(51) Int. Cl.
*H04L 29/06* (2006.01)
*G06F 7/04* (2006.01)
*G06F 9/00* (2006.01)
*G06F 12/14* (2006.01)
*G06F 13/00* (2006.01)

(52) U.S. Cl. ............ 713/165; 713/1; 713/2; 726/16

(58) Field of Classification Search .......... 713/1, 2, 713/165; 726/16
See application file for complete search history.

(56) References Cited

U.S. PATENT DOCUMENTS

| | | | | |
|---|---|---|---|---|
| 5,483,649 | A * | 1/1996 | Kuznetsov et al. | 726/22 |
| 7,100,036 | B2 * | 8/2006 | Schwartz | 713/2 |
| 2005/0193195 | A1 * | 9/2005 | Wu et al. | 713/165 |
| 2009/0106517 | A1 * | 4/2009 | Wang | 711/164 |

* cited by examiner

*Primary Examiner* — Mark Connolly
(74) *Attorney, Agent, or Firm* — Thomas, Kayden, Horstemeyer & Risley, LLP

(57) ABSTRACT

This invention presented a hard disk security method in a computer system, which provides a hard disk security mechanism combining with the power-on password function for the storage data in a hard disk by restoring the partition table into the BIOS ROM in advance, and deleting the partition table of the hard disk to secure the hard disk.

10 Claims, 5 Drawing Sheets

HARD DISK SECURITY METHOD IN A COMPUTER SYSTEM

RELATED APPLICATIONS

This application claims priority to Taiwan Application Serial Number 96128093, filed Jul. 31, 2007, which is herein incorporated by reference.

BACKGROUND

1. Field of Invention

The presented invention relates to a hard disk security method in a computer system. More particularly, the presented invention relates the technique of storing and rewriting the partition table of a hard disk to secure hard disk data.

2. Description of Related Art

In aspect of personal PC, a hard disk is often used as a data storage device. So the importance of the data storage device security in a personal PC is gradually increasing. Encrypting files and data is commonly used to prevent those who are not authenticated. However, encrypting and decrypting are inconvenient since not only a password is needed to be memorized, but the overall protection is not enough.

Thereafter, an encryption via firmware for a whole hard disk is developed. For instance, by attaching a chip between a hard disk and a computer system, a user has to access the hard disk with a substantial gold-key or even fingerprints. The general concept of the encryption via firmware is that when activating the encryption, the authentication is set. And when subsequently accessing data from the encrypted hard disk, all files will be encrypted. Thus the encrypted hard disk is regarded as a normal hard disk from a user's point of view, and each file does not need to arrange any encryption. However, the encrypted hard disk via firmware is the same as a dead locked hard disk. If installing the encrypted hard disk in another computer system, it will show up as an unformatted hard disk or format error and fail reading. So, in practice, the encrypted hard disk via firmware is only able to be re-used if it has been decrypted, instead of being formatted. Hence, if an employee leaves the position without decrypting the encrypted hard disk or loses the substantial gold-key, the encrypted hard disk will become a scrapped hard disk.

SUMMARY

For this reason, this invention provides a hard disk security method in a computer system. Mainly, by means of the Basic Input-Output System (BIOS) storing and writing the partition table, and combining with the predetermined password, such as the Power-On Password, of the computer system to realize this hard disk security mechanism. When the hard disk security mechanism is activated, the content of the partition table in the Master Boot Record (MBR) of the secured computer is stored and reserved in the BIOS in advance before the computer system proceeds to the suspend-to-disk mode or shuts down. Then a null value, i.e. 00h, is written into the specific section of the partition table in the MBR to overwrite the original partition table of the hard disk. The next time the computer system is booting, after the correct predetermined password is input and the hard disk serial number (HDD serial number) is compared corresponding to the hard disk in the computer system, the partition table previously stored in the BIOS ROM will be rewritten back into the MBR of the hard disk to resume the partition table of the hard disk. Thus the hard disk is resumed to be ready for use for the access reference of the retrieved original partition table.

Therefore, when activating the hard disk security mechanism, before the computer system proceeds to the suspend-to-disk mode or shuts down, the hard disk serial number and the partition table of the securing hard disk is saved in the BIOS ROM. And then after the section for the partition table in the MBR is overwritten the null value, i.e. 00h, the computer system power will shut down. The securing hard disk is unable to read and write without the partition table as the access reference. Accordingly, to install the hard disk on any other computer system, the securing hard disk is like an unformatted disk lacking of the access reference to read and write.

The next time the BIOS initializes the computer system during booting or resuming from the Suspend-to-Disk mode (STD), the predetermined password is requested to be input by a user. Besides determining if the predetermined password is correct, the hard disk serial number is checked to see if it corresponds to the predetermined password of the hard disk. If one of the above-mentioned conditions is not conformed, the BIOS will cease the computer system from booting or resuming from the STD mode, so the computer system will fail to enter the condition under the operation system. But, if the input predetermined password is correct and corresponding to the hard disk serial number, the BIOS will write the content of the partition table stored in the BIOS ROM back into the MBR of the hard disk to retrieve the partition table as the access reference to recover the hard disk for reading and writing.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
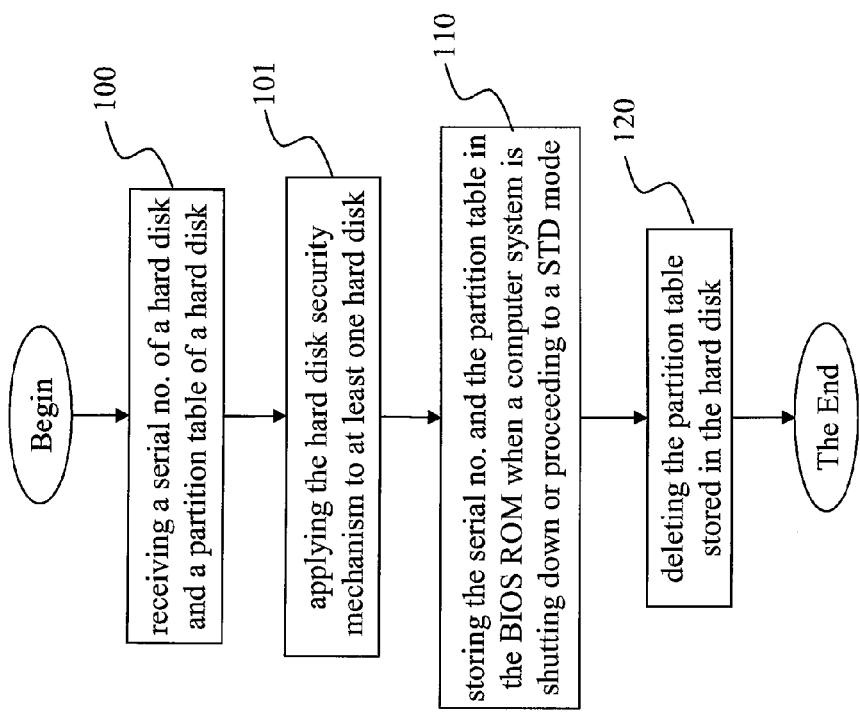
FIG. 1 is a flowchart illustrating steps of the hard disk security method of this invention.

Reference will now be made in detail to the present embodiments of the invention, examples of which are illustrated in the accompanying drawings. Wherever possible, the same reference numbers are used in the drawings and the description to refer to the same or like parts.

Refer to FIG. 1. FIG. 1 is a flowchart illustrating steps of the hard disk security method of this invention. As shown in FIG. 1, the hard disk security method comprises following steps: receiving a serial number of a hard disk and a partition table of the hard disk (Step 100); storing the serial number and the partition table in the BIOS ROM when a computer system is shutting down or proceeding to a suspend-to-disk mode (STD) (Step 110); and deleting the partition table stored in the hard disk after storing the hard disk serial number and the partition table into the BIOS ROM (Step 120). Wherein, the partition table is the partition information stored in the specific section in the Master Boot Record (MBR) of the hard disk. And wherein the suspend-to-disk mode (STD) is that when the computer system hibernates, all programs in use will be saved to the hard drive and power will completely shut down. The above-mentioned Step 100 comprises applying the hard disk security mechanism to at least one hard disk (Step 101). The Step 120 of deleting the partition table stored in the hard disk is by overwriting a null value into the section of the MBR for storing the partition table.

Figure 2:
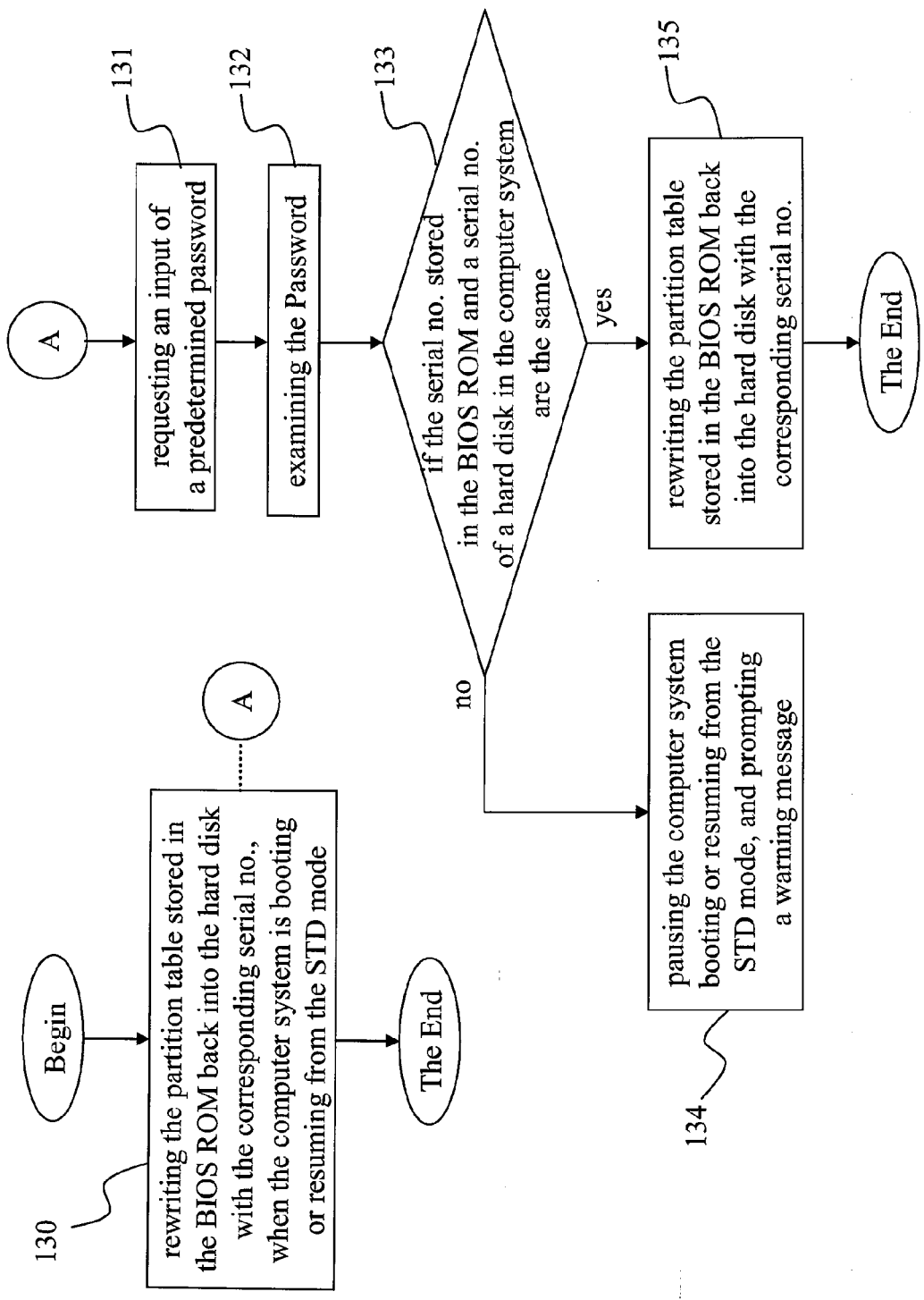
FIG. 2 is a flowchart illustrating steps of de-securing the hard disk of this invention.

Refer to FIG. 2. FIG. 2 is a flowchart illustrating steps of deactivating the hard disk security of this invention. As shown in FIG. 2, the hard disk security method of this invention further comprises: rewriting the partition table stored in the BIOS ROM back into the hard disk with the corresponding serial number, when the computer system is booting or resuming from the STD mode (Step 130). In Step 130, a detailed procedure A comprises following steps: requesting an input of a predetermined password (Step 131), wherein the predetermined password is the user password required for the initiation of the computer system BIOS; examining the password (Step 132); comparing the serial number stored in the BIOS ROM with a serial number of a hard disk in the computer system (Step 133). If the serial number stored in the BIOS ROM and a serial number of a hard disk in the computer system are different in Step 133, pausing the computer system booting or resuming from the STD mode and prompting a warning massage (Step 134). But if the serial number stored in the BIOS ROM and a serial number of a hard disk in the computer system are the same in Step 133, that is, the partition table stored in the BIOS ROM belongs to the hard disk in the computer system, so the partition table stored in the BIOS ROM is rewritten back into the hard disk with the corresponding hard disk serial number (Step 135).

Therefore, the method of the presented invention provides storing the partition table content in the MBR of the securing hard disk into the BIOS ROM in advance and writing a null value, i.e. 00h, to overwrite the original partition table in the MBR of the hard disk, before the computer system shuts down or proceeds to the STD mode. When the computer system is booting the next time, the predetermined password is input correctly, the partition table previously stored in the BIOS ROM is written back into the hard disk with the corresponding serial number to retrieve the access reference to recover the hard disk for reading and writing.

Figure 3A:
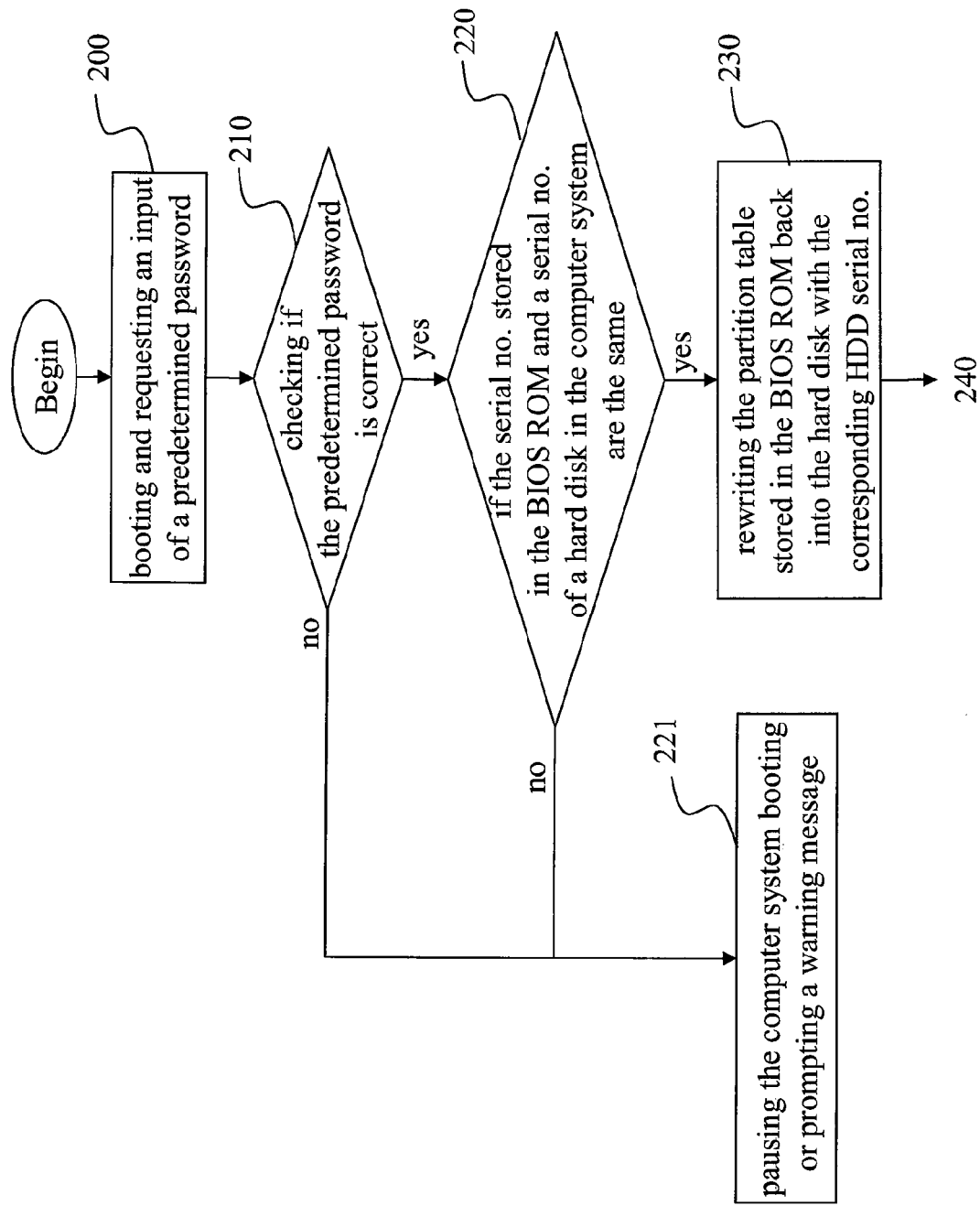
FIGS. 3A, 3B and 3C are flowcharts illustrating the system operation of the hard disk security method of this invention.
Figure 3B:
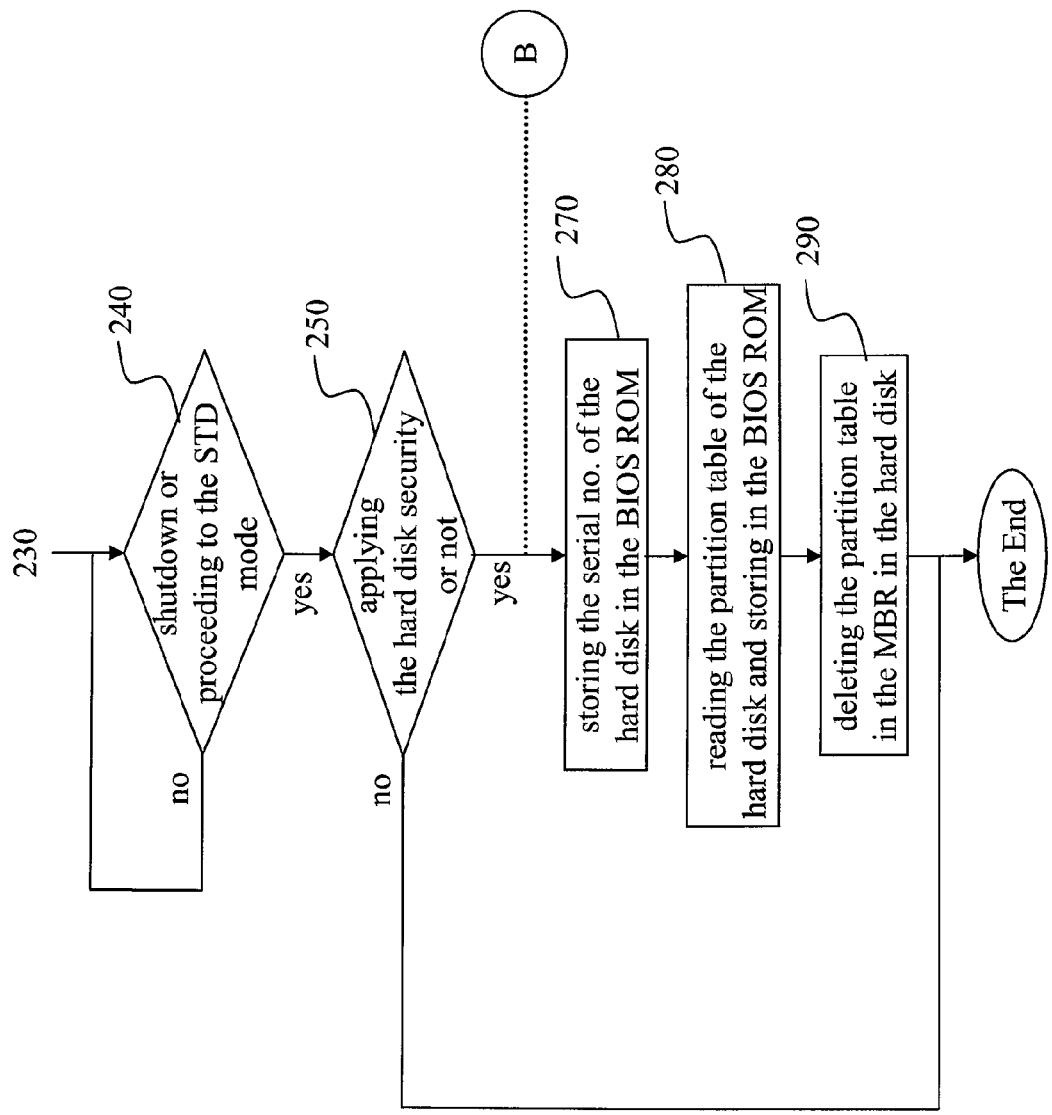
Figure 3C:
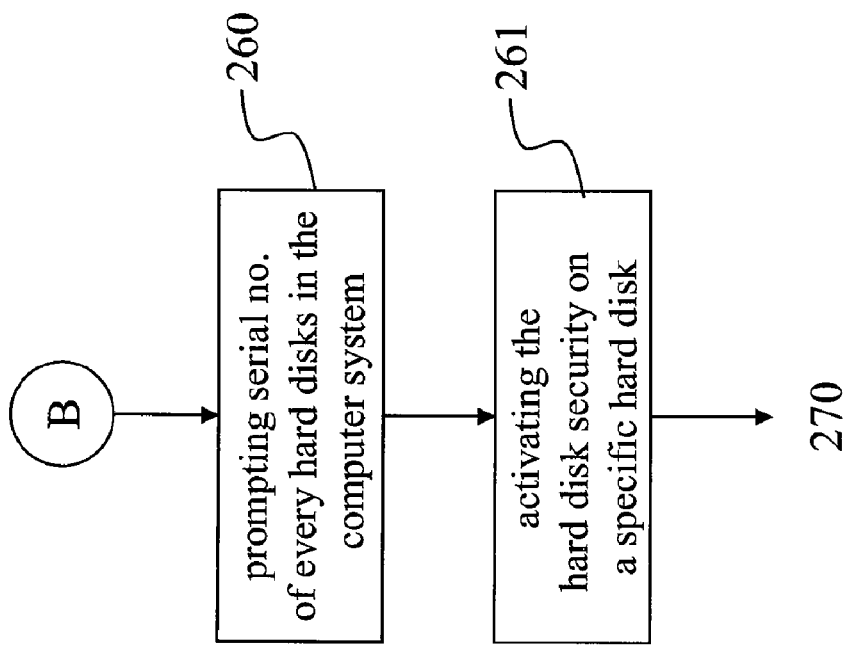

Refer to FIGS. 3A, 3B and 3C. FIGS. 3A, 3B and 3C are flowcharts illustrating the system operation of the hard disk security method of this invention. Firstly, as shown in FIG. 3A, is the hard disk security mechanism of this invention combining with the predetermined password. When the computer system is booting or resuming from the STD mode, the procedure starts from booting and requesting an input of a predetermined password (Step 200). Then, the computer system checks if the predetermined password is correct (Step 210). If the predetermined password is incorrect in Step 210, the computer system booting is paused, or the computer system resumes from the STD mode and prompts a warning massage (Step 221). But if the predetermined password is correct in Step 210, then comparing the serial number stored in the BIOS ROM with a serial number of the hard disk in the computer system (Step 220). If the serial number stored in the BIOS ROM and the serial number of the hard disk in the computer system are different in Step 220, the computer system booting is paused, or the computer system resumes from the STD mode and prompts a warning massage (Step 221). But if the two serial numbers are the same in Step 220, the partition table stored in the BIOS ROM is rewritten back into the hard disk with the corresponding hard disk serial number (Step 230). Then, the computer system will complete the BIOS booting and enter the operation system (OS) for user's operation. After Step 230, the computer system is then controlled by the OS for processing user's commands and inputting/outputting data.

Then referring to FIG. 3B, when the user stops using the computer system, the computer system is shut down or proceeding to the STD mode (Step 240). At that time, the computer system will ask the user to apply the hard disk security or not (Step 250). In the Step 250, if the computer system is not applied the hard disk security, the procedure ends up, and the computer system is directly shut down or proceeding to the STD mode. But if the hard disk security is activated to the computer system, the serial number of the hard disk is read and stored in the BIOS ROM (Step 270). Then, the partition table of the hard disk is read and stored in the BIOS ROM (Step 280). Following Step 280, the computer system deletes the partition table in the MBR in the hard disk (Step 290). At last, the procedure will end and the computer system will shut down or proceed to the STD mode.

Following the above-mentioned Step 250, a detailed procedure B is involved referring to FIG. 3C. As shown in FIG. 3C, the procedure further comprises following steps: prompting the serial numbers of every hard disks in the computer system (Step 260); and activating the hard disk security on a specific hard disk (Step 270).

By the hard disk security mechanism of this invention, when a computer system shuts down or proceeds to the suspend-to-disk mode, the hard disk is secured for the content of the partition table is stored in the BIOS ROM, and the partition table of the hard disk is deleted to be incapable of read and write. And, by comparing the serial number saved in the BIOS ROM with the serial number of the hard disk of the computer system, ensures the original partition table of the secured hard disk being rewritten back when booting in the same origin computer system. Besides, it also ensures the partition tables of other hard disks, which is installed in the computer system, not being overwritten when booting. Therefore, the secured hard disk must be installed in the same original computer system, which shut down previously, to retrieve the partition table of the secured hard disk to recover its function of read and write. So it is possible to prevent data stored in the secured hard disk from accessing.

Moreover, this invention provides a hard disk security mechanism with the partition table, combining with the predetermined password. The secured hard disk merely lost the access reference to be read and written, but the secured hard disk still can be formatted as an empty hard disk to re-use.

Although the present invention has been described in considerable detail with reference certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hard disk security method in a computer system, comprising:
   receiving a serial number of a hard disk and a partition table of the hard disk;
   storing the serial number and the partition table in the BIOS ROM when a computer system is shutting down or proceeding to a suspend-to-disk mode (STD); and deleting the partition table stored in the hard disk after storing the hard disk serial number and the partition table in the BIOS ROM.

2. The hard disk security method of claim 1, wherein the partition table is the partition information stored in the specific section in the Master Boot Record (MBR) of the hard disk.

3. The hard disk security method of claim 2, wherein the step of deleting the partition table stored in the hard disk comprises overwriting a null value into the section of the MBR for storing the partition table.

4. The hard disk security method of claim 1, further comprising: receiving an input signal to select at least one hard disk to activate the hard disk security.

5. The hard disk security method of claim 1, further comprising:
rewriting the partition table stored in the BIOS ROM back into the hard disk with the corresponding serial number, when the computer system is booting or resuming from the STD mode.

6. The hard disk security method of claim 5, further comprising: comparing the serial number stored in the BIOS ROM with a serial number of a hard disk in the computer system, when the hard disk in the computer system is booting or resuming from the STD mode.

7. The hard disk security method of claim 6, further comprising: pausing the computer system booting, when the serial number stored in the BIOS ROM and the serial number of the hard disk are different.

8. The hard disk security method of claim 6, further comprising: resuming process and prompting a warning massage, when the serial number stored in the BIOS ROM and the serial number of the hard disk are different.

9. The hard disk security method of claim 5, further comprising:
requesting an input of a predetermined password.

10. The hard disk security method of claim 9, further comprising:
rewriting the partition table stored in the BIOS ROM into the hard disk after determining the consistency of the serial number stored in the BIOS ROM and the serial number of the hard disk and the correction of the input of the predetermined password.

* * * * *